US011556443B2

(12) United States Patent
Chang

(10) Patent No.: US 11,556,443 B2
(45) Date of Patent: Jan. 17, 2023

(54) SIGNAL TUNING METHOD FOR PERIPHERAL COMPONENT INTERCONNECT EXPRESS AND COMPUTER SYSTEM USING THE SAME

(71) Applicant: Wiwynn Corporation, New Taipei (TW)

(72) Inventor: Shih-Hui Chang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 16/732,363

(22) Filed: Jan. 2, 2020

(65) Prior Publication Data

US 2021/0133071 A1 May 6, 2021

(30) Foreign Application Priority Data

Nov. 1, 2019 (TW) .................................. 108139604

(51) Int. Cl.
| | |
|---|---|
| *G06F 11/30* | (2006.01) |
| *G06F 11/07* | (2006.01) |
| *G06F 11/32* | (2006.01) |
| *G06F 13/42* | (2006.01) |

(52) U.S. Cl.
CPC ........ *G06F 11/3041* (2013.01); *G06F 11/076* (2013.01); *G06F 11/0757* (2013.01); *G06F 11/322* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 9,286,266 | B1 * | 3/2016 | Fleck | G07C 5/0825 |
| 9,432,298 | B1 * | 8/2016 | Smith | H04L 49/9057 |
| 9,462,489 | B2 * | 10/2016 | Mowa | H04W 36/245 |
| 10,840,735 | B1 * | 11/2020 | Cooper | H02J 3/32 |
| 10,860,522 | B2 * | 12/2020 | Kung | G06F 13/4022 |
| 2005/0137757 | A1 * | 6/2005 | Phelan | G07C 5/02 |
| | | | | 701/1 |
| 2005/0154930 | A1 * | 7/2005 | Morrow | G06F 1/26 |
| | | | | 713/300 |
| 2008/0284539 | A1 * | 11/2008 | Tateoka | H03F 1/56 |
| | | | | 333/124 |
| 2012/0188059 | A1 * | 7/2012 | Ueda | G06K 7/0008 |
| | | | | 340/10.1 |
| 2013/0073112 | A1 * | 3/2013 | Phelan | G07C 5/02 |
| | | | | 701/1 |
| 2013/0145212 | A1 * | 6/2013 | Hsu | G06F 11/2733 |
| | | | | 714/27 |

(Continued)

FOREIGN PATENT DOCUMENTS

WO WO-2020125839 A1 * 6/2020 ............. G06F 21/31

*Primary Examiner* — Henry Tsai
*Assistant Examiner* — Christopher A Bartels
(74) *Attorney, Agent, or Firm* — Winston Hsu

(57) ABSTRACT

A signal tuning method for a peripheral component interconnect express (PCIe) includes assigning a first signal setting to the PCIe to generate a first PCIe signal, and tuning a link by the first PCIe signal, and determining whether to assign a second signal setting to the PCIe according to a signal status of the link, for generating a second PCIe signal to tune the link; wherein the PCIe is connected to a plurality of electronic devices via the link.

4 Claims, 2 Drawing Sheets

(56) References Cited

U.S. PATENT DOCUMENTS

| | | | |
|---|---|---|---|
| 2015/0334578 A1* | 11/2015 | Mowa | H04W 36/165 |
| | | | 370/241 |
| 2016/0182154 A1* | 6/2016 | Fang | H04B 10/2575 |
| | | | 398/116 |
| 2017/0019247 A1* | 1/2017 | Iyer | H04L 1/243 |
| 2017/0346596 A1* | 11/2017 | Desimone | H04L 1/0034 |
| 2018/0191523 A1* | 7/2018 | Shah | H04B 3/36 |
| 2019/0121647 A1* | 4/2019 | Por | G06F 11/2284 |
| 2019/0173466 A1* | 6/2019 | Prevost | H04B 1/006 |
| 2019/0379638 A1* | 12/2019 | Arnberg | H04L 63/0209 |
| 2019/0385057 A1* | 12/2019 | Litichever | H04L 63/14 |
| 2020/0336450 A1* | 10/2020 | Gao | H04L 67/306 |
| 2021/0021431 A1* | 1/2021 | Guim Bernat | H04L 9/3215 |
| 2022/0126864 A1* | 4/2022 | Moustafa | B60W 60/0057 |

* cited by examiner

SIGNAL TUNING METHOD FOR PERIPHERAL COMPONENT INTERCONNECT EXPRESS AND COMPUTER SYSTEM USING THE SAME

BACKGROUND OF THE INVENTION

1. Field of the Invention

The present invention relates to a signal tuning method for a peripheral component interconnect express (PCIe) and a computer system using the same, and more particularly, to a signal tuning method for a PCIe and a computer system using the same, capable of dynamically tuning a signal setting of the PCIe to achieve a better transmission signal.

2. Description of the Prior Art

With the improvement of data transmission rates for a conventional high-speed input/output bus, a reliable and stable signal quality of a transmission channel is hard to achieve. The Peripheral Component Interconnect Express (PCIe) is a transmission interface for a high-speed serial interconnect protocol, and may be utilized for solving the growing needs of bandwidth and improving efficiency. In general, after manufacturing of the PCIe is completed, a fixed signal setting is selected. A serial link adopted by the PCIe will be affected by physical phenomena, however, such as mutual interference, jittering, and intersymbol interference (ISI). This may in turn affect a transmission quality of the PCIe signal, such as a bit error rate (BER). A PCIe may be employed in many different environments having different temperature and humidity conditions. Further, elements of the PCIe may age at different rates, either due to or independent of the environmental conditions. If a fixed signal setting for the PCIe is used, this may affect the transmission quality and stability of the PCIe signal, and the need of customer for signal quality cannot be fulfilled. In other words, the conventional technique requires improvements.

SUMMARY OF THE INVENTION

Therefore, the present invention provides a signal tuning method for a peripheral component interconnect express (PCIe) and a computer system using the same, which can dynamically tune a signal setting of the PCIe to achieve a better signal transmission quality.

An embodiment of the present invention discloses a signal tuning method for a peripheral component interconnect express (PCIe), comprising: assigning a first signal setting to the PCIe to generate a first PCIe signal, and tuning a link by the first PCIe signal; and determining whether to assign a second signal setting to the PCIe according to a signal status of the link, for generating a second PCIe signal to tune the link; wherein the PCIe is connected to a plurality of electronic devices via the link.

Another embodiment of the present invention discloses a computer system, for a peripheral component interconnect express (PCIe), comprising: a processing device; and a PCIe device, coupled to the processing device, for storing a program code instructing the processing device to assign a first signal setting to the PCIe to generate a first PCIe signal, tune a link by the first PCIe signal, and determine whether to assign a second signal setting to the PCIe according to a signal status of the link, for generating a second PCIe signal to tune the link; wherein the PCIe is connected to a plurality of electronic devices via the link.

These and other objectives of the present invention will no doubt become obvious to those of ordinary skill in the art after reading the following detailed description of the preferred embodiment that is illustrated in the various figures and drawings.

DETAILED DESCRIPTION

A conventional signal setting of a Peripheral Component Interconnect Express (PCIe) is fixed after the manufacturing process is finished and the PCIe has left the factory. This means that the waveform parameters for generating PCIe signals are fixed, i.e. a signal setting of the PCIe is identical in any environment. Thus, when a status of the PCIe changes due to environmental factors such as temperature or humidity, or any element of the PCIe ages, a signal transmission quality of the PCIe, e.g. a bit error rate (BER) or a confidence level (CL), will be affected. In order to improve upon the prior art, the present invention provides a tuning mechanism for the PCIe to dynamically tune the signal setting of the PCIe to thereby improve the transmission signal of the PCIe.

Figure 1:
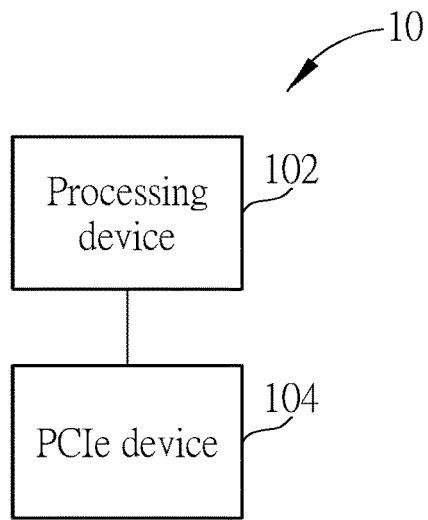
FIG. 1 is a schematic diagram of a computer system according to an embodiment of the present invention.

Refer to FIG. 1, which is a schematic diagram of a computer system 10 according to an embodiment of the present invention. The computer system 10 may be utilized for a Peripheral Component Interconnect Express (PCIe), which is not illustrated in the figure. The PCIe is for connecting a plurality of electronic devices to establish links between the electronic devices in order to transmit signals. The computer system 10 includes a processing device 102 and a PCIe device 104, wherein the PCIe device 104 may be a storage device, a network interface card, a General-purpose computing on graphics processing units (GPGPU), an accelerator card, etc. The PCIe device 104 is configured to store a program code for instructing the processing device 102 to perform relative operations.

Figure 2:
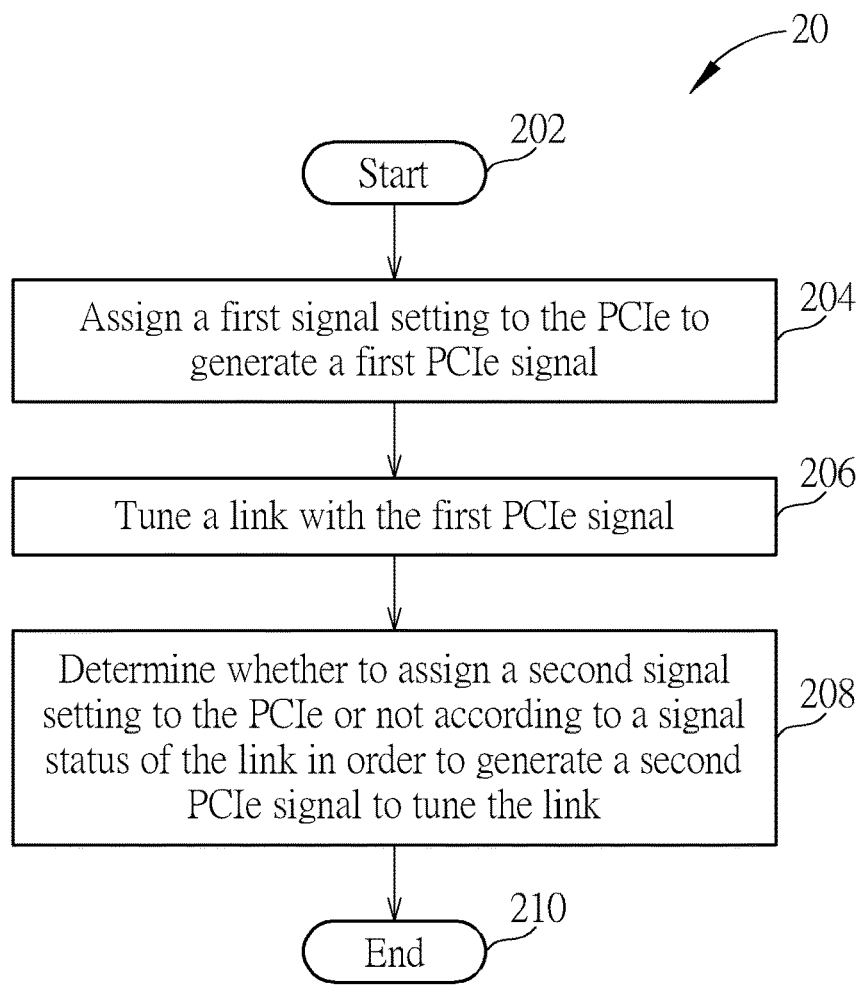
FIG. 2 is a schematic diagram of a tuning process according to an embodiment of the present invention.

Refer to FIG. 2, which is a schematic diagram of a tuning process 20 according to an embodiment of the present invention. The tuning process 20 may be compiled as a program code and stored in the PCIe device 104 for instructing the processing device 102 to execute corresponding operations. The tuning process 20 includes the following steps:

Step 202: Start.

Step 204: Assign a first signal setting to the PCIe to generate a first PCIe signal.

Step 206: Tune a link with the first PCIe signal.

Step 208: Determine whether to assign a second signal setting to the PCIe or not according to a signal status of the link in order to generate a second PCIe signal to tune the link.

Step 210: End.

Based on the tuning process 20, in step 204 and step 206, the computer system 10 may assign the first signal setting to the PCIe for generating the first PCIe signal to tune the links between the electronic devices and the PCIe accordingly. In step 208, based on the signal status of the links (e.g. BER or CL) between the electronic devices and the PCIe, the computer system 10 determines whether or not to assign the second signal setting to the PCIe to thereby generate the second PCIe signal and tune the links accordingly, wherein the second signal setting is different from the first signal setting. The computer system 10 may dynamically monitor the signal status of the links between the electronic devices and the PCIe. When BER or CL of the link is not able to fulfill a user request, the computer system 10 may assign the signal setting (being different from the original) to the PCIe to fulfill the request referring to BER or CL of the user.

In an embodiment, the signal status of the link may be BER in a predetermined time period. Taking a PCIe Gen 3 as an example, when a request of the user is $10^{-14}$ of the BER and 95% of the CL of the signal status, representing that, at most, 5 error bits can be generated within 131500 seconds. Therefore, according to this embodiment, 131,500 seconds may be taken as the predetermined time period to accordingly examine whether or not 5 error bits of the PCIe are generated in the predetermined time period.

In order to adapt to different environmental conditions, the computer system 10 may assign different signal settings to the PCIe. Therefore, the computer system 10 according to an embodiment of the present invention may further include a signal setting table, where each signal setting in the signal setting table may correspond to different waveform parameters of the PCIe signal. In the above embodiments, when the request of the user cannot be fulfilled by the signal status of the first signal setting, the computer system 10 may change the signal setting based on a specific order or randomly from the signal setting table (for example, the second signal setting or an N-th signal setting) to instruct the PCIe to tune the link with different signal settings. Notably, an amount of signal settings which may be stored in the signal setting table is not limited, and different amounts of the waveform parameters corresponding to the signal settings for humidity and temperature etc. may be determined. Therefore, the computer system 10 may dynamically tune an optimal signal setting for different environments in step 208 to perform signal transmission with the optimal signal setting.

Figure 3:
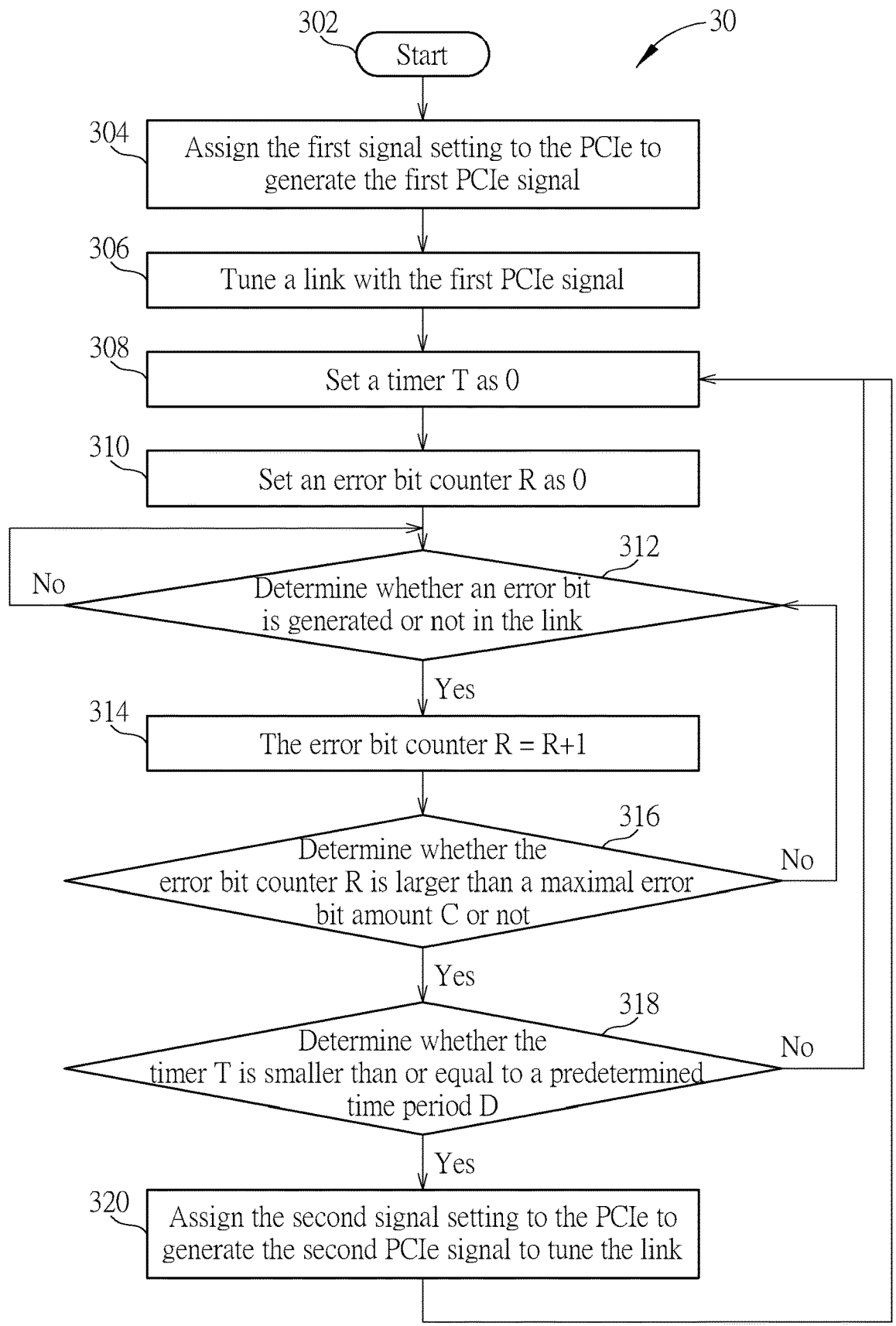
FIG. 3 is a schematic diagram of a tuning process according to another embodiment of the present invention.

In another embodiment, an error bit counter and a timer may be utilized for examining the signal status of the computer system 10. The computer system 10 may examine whether or not an amount of error bits of the error bit counter is larger than a maximal tolerable error amount within the predetermined time period. Refer to FIG. 3, which is a schematic diagram of a tuning process 30 according to an embodiment of the present invention. The tuning process 30 may be compiled as a program code and stored in the PCIe device 104 to instruct the processing device 102 to execute corresponding operations. The tuning process 30 includes the following steps:

Step 302: Start.

Step 304: Assign the first signal setting to the PCIe to generate the first PCIe signal.

Step 306: Tune a link with the first PCIe signal.

Step 308: Set a timer T as 0.

Step 310: Set an error bit counter R as 0.

Step 312: Determine whether an error bit is generated or not in the link. If yes, go to step 314; if no, go to step 312.

Step 314: The error bit counter R=R+1.

Step 316: Determine whether the error bit counter R is larger than a maximal error bit amount C or not. If yes, go to step 318; if no, go to step 312.

Step 318: Determine whether the timer T is smaller than or equal to a predetermined time period D. If yes, go to step 320; if no, go to step 308.

Step 320: Assign the second signal setting to the PCIe to generate the second PCIe signal to tune the link and go back to step 308.

Based on the tuning process 30, the timer T and the error bit counter R are added to the present invention to examine whether the request of the signal status of the PCIe is met. In step 304, the default first signal setting is assigned to the PCIe to generate the first PCIe signal. In step 306, the first PCIe signal is utilized for tuning the link. In step 308 and step 310, the timer T and the error bit counter R are respectively set as 0. Then, in step 312, the tuning process 30 determines whether or not one error bit is generated in the link. If one error bit is generated, the tuning process 30 goes to step 314 and the error bit counter R is increased by 1 (i.e. R=R+1); if no error bit is generated, the tuning process 30 stays in step 312 to determine whether or not one error bit is generated in the link. Then, in step 316, the tuning process 30 determines whether the error bit counter R is larger than the maximal error bit amount C. If the error bit counter R is larger than the maximal error bit amount C, the tuning process 30 goes to step 318; if not, the tuning process 30 goes back to step 312. Thus, the tuning process 30 determines whether or not the link of the first PCIe signal meets the request of the signal status in step 316 and step 318. In step 318, when the timer T is smaller than or equal to the predetermined time period D, i.e. an amount of error bits accumulated within the predetermined time period D is larger than the maximal error bit amount C, the tuning process 30 goes to step 320 and the second signal setting is assigned to the PCIe to generate the second PCIe signal so as to tune the link. In contrast, in step 318, when the timer T is larger than the predetermined time period D, i.e. the amount of error bits accumulated within the predetermined time period D is smaller than or equal to the maximal error bit amount C, the tuning process 30 goes back to step 308 and continues to perform the signal transmission with the first PCIe signal. Consequently, the computer system 10 may dynamically tune the signal setting of the PCIe when the request of the signal status is not satisfied. By assigning the optimal signal setting to the PCIe, quality and stability of the signal transmission are thereby improved.

Notably, in the above embodiments, when the PCIe is a PCIe Gen 3, the request of BER is $10^{-14}$, the request of CL is 95% and the maximal error bits is 5 bits in the predetermined time period of 131,500 seconds, i.e. the maximal error bit amount C is 5 and the predetermined time period D is 131,500 seconds.

Moreover, those skilled in the art may properly design the computer system based on different requirements. For example, the tuning process of the present invention may not only be compiled as a software and stored in a PCIe device, but may also be implemented by hardware, e.g. an Application Specific Integrated Circuit (ASIC) or Field Programmable Gate Array (FPGA). The above embodiments take the PCIe Gen 3 as an example, but the invention is not limited thereto. Other generations of PCIe may be applicable to the present invention and may be adjusted according to instructions of a user/manufacturer or settings of the computer system, which are all within the scope of the present invention.

In summary, the present invention may dynamically tune the signal setting of the PCIe based on the signal status of the PCIe to meet the applied environmental conditions and status of elements, to thereby achieve a user or system requested quality for signal transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal tuning method for a peripheral component interconnect express (PCIe), comprising:
   assigning a first signal setting to the PCIe to generate a first PCIe signal, and tuning a link by the first PCIe signal; and
   determining whether to assign a second signal setting to the PCIe according to a signal status of the link, for generating a second PCIe signal to tune the link;
   wherein the PCIe is connected to a plurality of electronic devices via the link;
   wherein the first signal setting and the second signal setting respectively correspond to different waveform parameters of a PCIe signal, and the first signal setting and the second signal setting are respectively determined for different environment conditions of temperature and humidity;
   wherein the signal status is a bit error rate (BER) in a predetermined time period;
   wherein when the BER is larger than a maximal BER in the predetermined time period, the first signal setting is substituted by the second signal setting and assigned to the PCIe for tuning the link.

2. The signal tuning method of claim 1, wherein the first signal setting and the second signal setting are selected from a signal setting table.

3. A computer system, for a peripheral component interconnect express (PCIe), comprising:
   a processing device; and
   a PCIe device, coupled to the processing device, for storing a program code instructing the processing device to assign a first signal setting to the PCIe to generate a first PCIe signal, tune a link by the first PCIe signal, and determine whether to assign a second signal setting to the PCIe according to a signal status of the link, for generating a second PCIe signal to tune the link;
   wherein the PCIe is connected to a plurality of electronic devices via the link;
   wherein the first signal setting and the second signal setting respectively correspond to different waveform parameters of a PCIe signal, and the first signal setting and the second signal setting are respectively determined for different environment conditions of temperature and humidity;
   wherein the signal status is a bit error rate (BER) in a predetermined time period;
   wherein when the BER is larger than a maximal BER in the predetermined time period, the first signal setting is substituted by the second signal setting and assigned to the PCIe for tuning the link.

4. The computer system of claim 3, wherein the first signal setting and the second signal setting are selected from a signal setting table.

* * * * *